(12) United States Patent
Shin (10) Patent No.: US 8,698,759 B2
(45) Date of Patent: Apr. 15, 2014

(54) METHOD AND APPARATUS OF PROVIDING HAPTIC EFFECT USING A PLURALITY OF VIBRATORS IN A PORTABLE TERMINAL

(75) Inventor: Kyu-Ho Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 335 days.

(21) Appl. No.: 12/722,804

(22) Filed: Mar. 12, 2010

(65) Prior Publication Data

US 2010/0238116 A1    Sep. 23, 2010

(30) Foreign Application Priority Data

Mar. 20, 2009 (KR) .................. 10-2009-0023740

(51) Int. Cl.
*G06F 3/041* (2006.01)

(52) U.S. Cl.
USPC .......................................... 345/173

(58) Field of Classification Search
USPC .............. 345/173, 156; 178/18.04–19.04; 715/863–864
See application file for complete search history.

(56) References Cited

U.S. PATENT DOCUMENTS

| | | | |
|---|---|---|---|
| 2007/0040815 A1* | 2/2007 | Rosenberg et al. | 345/173 |
| 2008/0252616 A1* | 10/2008 | Chen | 345/175 |
| 2010/0328053 A1* | 12/2010 | Yeh et al. | 340/407.2 |

FOREIGN PATENT DOCUMENTS

KR   2008-058121   6/2008   ........... H04B 1/40

* cited by examiner

*Primary Examiner* — Yong H Sim
(74) *Attorney, Agent, or Firm* — Cha & Reiter, LLC (57) ABSTRACT

A method and apparatus for providing a haptic effect using a plurality of vibrators in a portable terminal. The method of providing a haptic effect using a plurality of vibrators in a portable terminal includes detecting whether user's input information is generated, determining a vibration strength level of each of the vibrators using the user's input information, and generating vibration according to the determined vibration strength via each of the vibrators.

18 Claims, 10 Drawing Sheets

METHOD AND APPARATUS OF PROVIDING HAPTIC EFFECT USING A PLURALITY OF VIBRATORS IN A PORTABLE TERMINAL

CLAIM OF PRIORITY

This application claims priority to an earlier Korean patent application filed in the Korean Intellectual Property Office on Mar. 20, 2009 and assigned Serial No. 10-2009-0023740, the entire disclosure of which is hereby incorporated by reference in its entirety.

BACKGROUND OF THE INVENTION

1. Field of the Invention

The present invention relates generally to a method and apparatus of providing haptic effect using a plurality of vibrators in a portable terminal, and in particular, to a method and apparatus of providing three-dimensional haptic effect according to a user's input position using a plurality of vibrators.

2. Description of the Related Art

A visual or auditory information is used in a conventional computer technology; however, a user demands more and more specific and realistic information. To meet such demand, therefore, a haptic technology transferring tactile information has been developed. The term 'haptic' designates a computer tactile technology, and derives from the Greek adjective 'haptesthai', which means 'contact or touch'.

The haptic technology includes a force feedback allowing a user to feel a force and a sense of motion, and a tactile feedback technology allowing a user to feel an object. The haptic technology is being widely applied to various fields such as a game simulator and a medical simulator.

In the advent of Internet and computer technologies, a number of portable terminals provide functions using the haptic technology to enrich consumer's experience. Herein, the portable terminal may include a cell phone, a personal digital assistant (PDA), a portable multimedia player (PMP), a digital camera, a portable game machine, an MP3 player, and the like. For example, a recently launched cell phone provides a technology capable of allowing a user to feel data input through vibration by generating a specific vibration pattern depending on a touched position of a screen.

A conventional portable terminal provides a haptic effect by controlling a vibration pattern or vibration strength using a single vibrator included in the terminal. However, in general, there is a limitation in the vibration pattern and vibration strength that can be generated using a single vibrator that meets a user's various demands and tastes.

SUMMARY OF THE INVENTION

An aspect of the present invention is to substantially solve at least the above problems and/or disadvantages and to provide at least the advantages below. Accordingly, an aspect of the present invention is to provide a method and apparatus of providing a haptic effect using a plurality of vibrators in a portable terminal.

Another aspect of the present invention is to provide a method and apparatus of generating three-dimensional vibration according to a user's input position using a plurality of vibrators in a portable terminal.

Another aspect of the present invention is to provide a method and apparatus of controlling vibration strengths of respective vibrators according to a user's touch position in a portable terminal.

Another aspect of the present invention is to provide a method and apparatus of controlling vibration strengths of respective vibrators according to a user's touch duration in a portable terminal.

According to an aspect of the present invention, a method of providing a haptic effect using a plurality of vibrators in a portable terminal includes: detecting whether user's input information is generated; determining a vibration strength level of each vibrator using the user's input information; and generating vibration according to the determined vibration strength via each of the vibrators.

According to another aspect of the present invention, an apparatus of providing a haptic effect using a plurality of vibrators in a portable terminal includes: a user input unit in which user's input information is generated; a vibration strength determination unit determining a vibration strength level of each of the vibrators according to the user's input information; and a control unit generating vibration according to the determined vibration strength via each of the vibrators.

BRIEF DESCRIPTION OF THE DRAWINGS

The above and other aspects, features and advantages of the present invention will become more apparent from the following detailed description when taken in conjunction with the accompanying drawings in which:

FIGS. 4 to 10 are schematic diagrams illustrating examples of generating a haptic effect in a portable terminal including four vibrators according to embodiments of the present invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Herein below, description will be given of a method and apparatus of generating three-dimensional vibration according to a user's touch using a plurality of vibrators in a portable terminal. Although a portable terminal having four vibrators will be exemplarily described below for illustrative purposes, it should be noted that the teachings of the present invention are applicable to a portable terminal including two or more vibrators.

Figure 1:
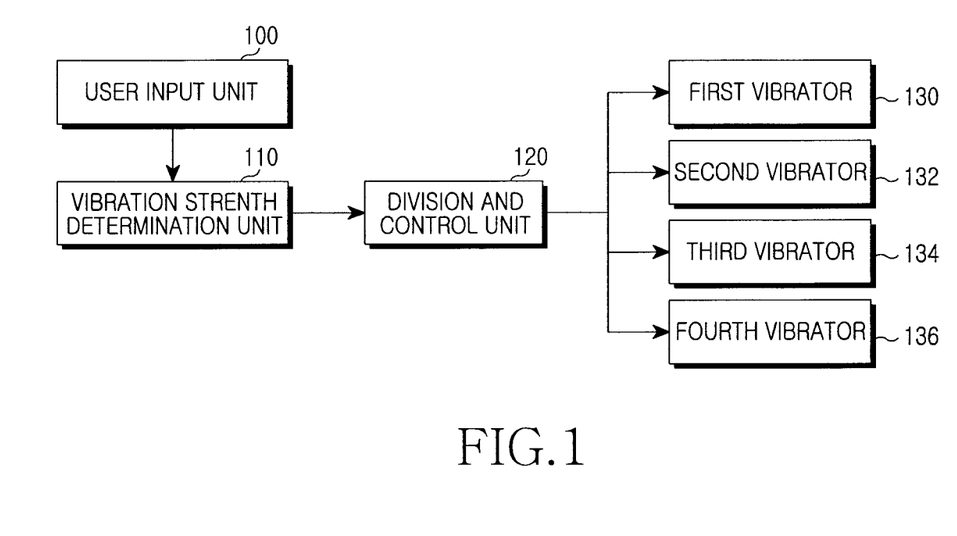
FIG. 1 is a block diagram illustrating a haptic effect in a portable terminal according to the present invention.

FIG. 1 is a block diagram illustrating a haptic effect in a portable terminal according to the present invention.

Referring to FIG. 1, the portable terminal includes a user input unit 100, a vibration strength determination unit 110, a division and control unit 120, a first vibrator 130, a second vibrator 132, a third vibrator 134 and a fourth vibrator 136.

The user input unit 100 receives a touch operation of a user, detects the input touch operation, then provides the detected result to the vibration strength determination unit 110. The user input unit 100 includes a touch sensor, which detects and provides a user's screen touch style, i.e., a touch position, a moving direction of the touch, a touch duration, or the like, to the vibration strength determination unit 110. For example, capacitive positioning sensor may be used. Here, the user input unit 100 detects the position of the screen touched by the user, and provides a corresponding coordinate to the vibration strength determination unit 110. Here, the finger may be in contact with the touch screen physically or near the screen.

The vibration strength determination unit 110 receives the detected touch result from the user input unit 100, and, in response, determines an appropriate vibration strength of each vibrator corresponding to the detected touch result. In detail, the vibration strength determination unit 110 determines the vibration strength of each vibrator by receiving the coordinate is indicative of the touched position of the screen and touch duration from the user input unit 100 and acquiring relative distance information between the touched position of the screen and each vibrator. That is, the vibration strength determination unit 110 determines the strength of each vibrator that needs to yield according to a distance ratio between the touched position of the screen and each vibrator. For example, the vibration strength determination unit 110 determines the level of vibration force being exerted on each vibrator which depends on the distance between the touched position of the screen and each vibrator. Hence, a vibrator disposed closer to the touched position of the screen generates a higher level of vibration and a vibrator disposed farther from the touched position of the screen has a lower level of vibration.

Thereafter, the vibration strength determination unit 110 re-determines the vibration strength level of each of the vibrators using a second consideration, which is based on the duration of touch operation by the user. Namely, the vibration strength determination unit 110 re-determines the vibration strength level of each vibrator in such a manner that the vibration strength of each vibrator increases as the touch duration increases. The vibration strength level of each vibrator may increase proportionally to the detected touch duration.

Finally, the vibration strength determination unit 110 provides the determined vibration strength level of each vibrator to the division and control unit 120.

The division and control unit 120 receives the vibration strength level of each vibrator from the vibration strength determination unit 110, and controls each vibrator to generate vibration according to the determined vibration strength level. Here, the division and control unit 120 determines a vibration pattern of each vibrator corresponding to the determined vibration strength level, and controls the first to fourth vibrators 130, 132, 134 and 136 to generate according to the determined vibration pattern. The vibration patterns of the respective vibrators may be identically or different depending on the touch location and duration of the touch.

The first to fourth vibrators 130, 132, 134 and 136 generate vibration according to the control of the division and control unit 120.

Figure 2:
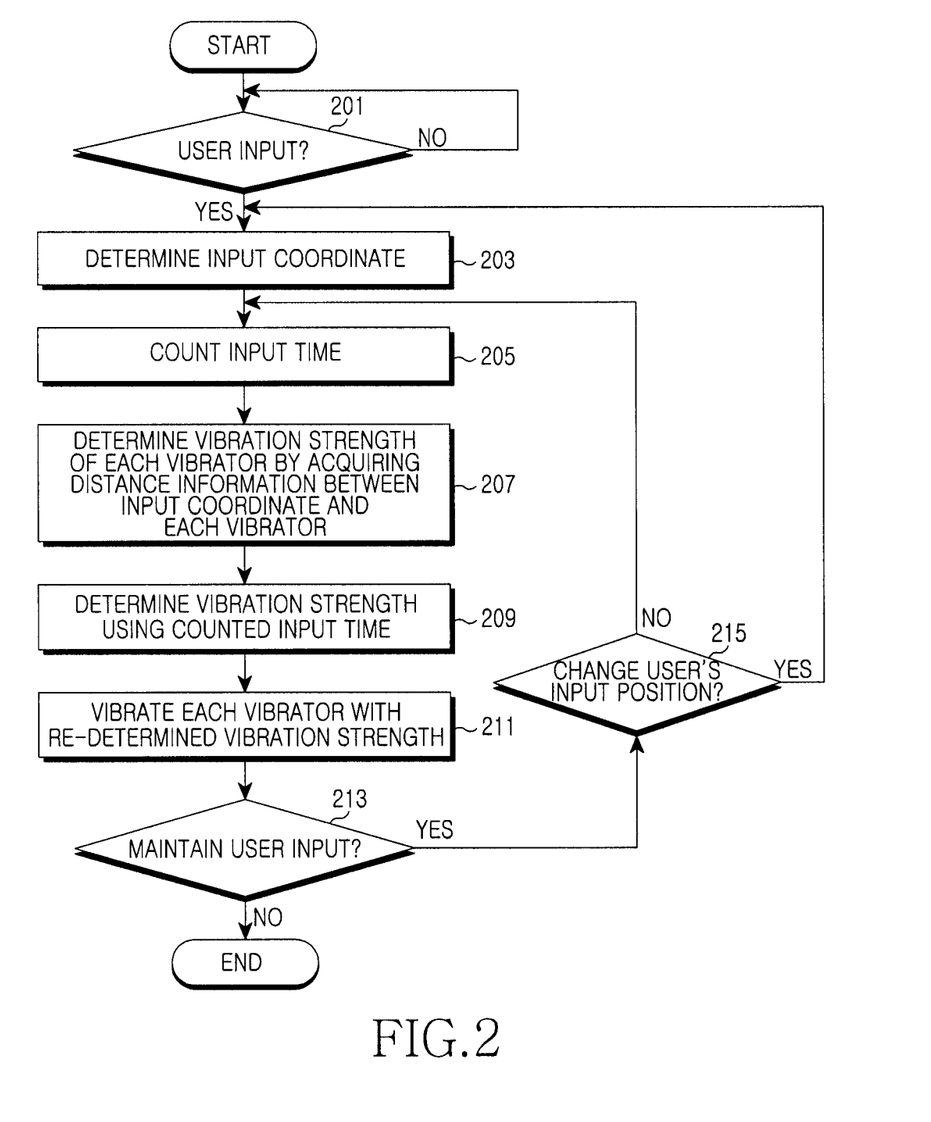
FIG. 2 is a flowchart illustrating a procedure of performing a haptic function using a plurality of vibrators in a portable terminal according to the present invention.

FIG. 2 is a flowchart illustrating a procedure of performing the haptic function using a plurality of vibrators in a portable terminal according to the present invention.

Referring to FIG. 2, in step 201, the portable terminal detects whether a user input is generated. That is, the portable terminal detects whether a user touches the screen or makes a contact near the screen without actual contact.

In step 203, when the user input is generated, the portable terminal determines a coordinate where the user input is generated, i.e., a coordinate corresponding to the user's touch position of the screen. Afterwards, the portable terminal counts a duration of user's input time in step 205. Here, at the timing when the user input is generated, a count number may be 1.

Thereafter, in step 207, the portable terminal acquires distance information between the coordinate corresponding to the user's input position and each vibrator, and then determines the vibration strength level of each vibrator using the acquired distance information. For example, the portable terminal determines the strength of a force exerted on each vibrator according to the distance between the touched position of the screen and each vibrator so that a vibrator disposed closer to the touched position of the screen has a stronger vibration or a higher vibration strength level and a vibrator disposed farther from the touched position of the screen has a weaker vibration or a lower vibration strength level.

Next, in step 209, the portable terminal re-determines the vibration strength level of each vibrator using the counted input time from the measured duration of the user's touch. Here, the portable terminal further re-adjusts or re-determines the vibration strength in such a manner that the vibration strength level of each vibrator increases proportionally as the touch duration increases. Here, the strength level of each vibration may be same or different from each vibrator.

Figure 3:
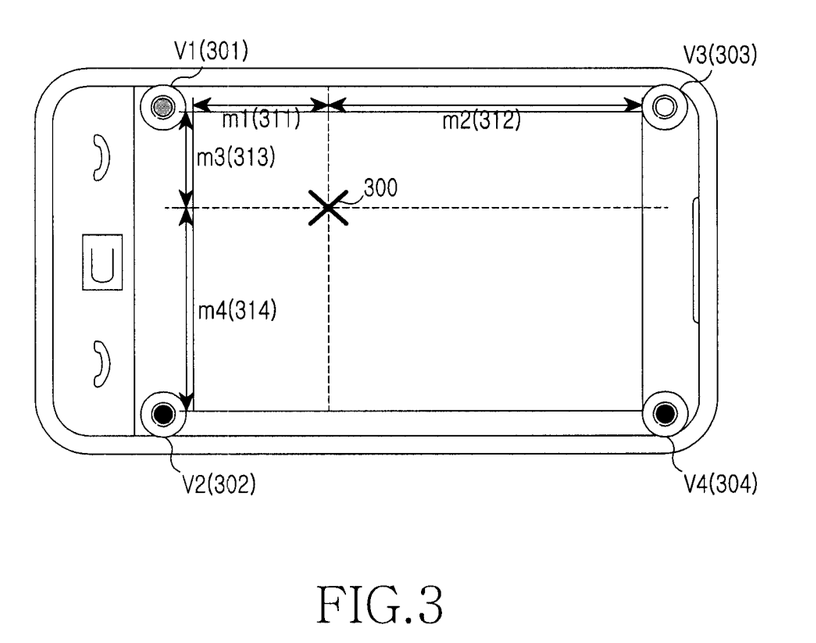
FIG. 3 is a schematic diagram illustrating a construction of a portable terminal including four vibrators according to an embodiment of the present invention.

The above teachings may be more apparent with reference to FIG. 3, which shows a method of determining the vibration strength level of each vibrator in the case where a specific position 300 is touched by a user in a portable terminal. Note that four vibrators V1 to V4 (301 to 304) are positioned at edges thereof or at edges of the screen. If a width is divided into m1 311 and m2 312 and a height is divided into m3 313 and m4 314 based on the touched position 300, the vibration strength of each vibrator may be determined by following Equation (1):

$$\text{Strength } 1 = [100 \times \{(m2 \times m4)/(\text{width} \times \text{height})\}]$$

$$\text{Strength } 2 = [100 \times \{(m1 \times m4)/(\text{width} \times \text{height})\}]$$

$$\text{Strength } 3 = [100 \times \{(m3 \times m2)/(\text{width} \times \text{height})\}]$$

$$\text{Strength } 4 = [100 \times \{(m1 \times m3)/(\text{width} \times \text{height})\}] \quad (1)$$

where the strengths 1 to 4 represent the vibration strength level of each vibrator V1 to V4, i.e., 301 to 304, the width represents the total width of the screen, and the height represents the total height of the screen. As expressed in Equation (1) above, the vibration strength level of each vibrator has different values depending on the touched positions. As the touch position that is closer to the respective vibrator would yield a stronger vibration.

In addition, when the touch duration of the specific position is represented as Z, the vibration strength level of each vibrator may be re-adjusted by following Equation (2):

$$\text{Strength 1} = [100 \times \{(m2 \times m4)/(\text{width} \times \text{height})\}] \times Z \text{ value}$$

$$\text{Strength 2} = [100 \times \{(m1 \times m4)/(\text{width} \times \text{height})\}] \times Z \text{ value}$$

$$\text{Strength 3} = [100 \times \{(m3 \times m2)/(\text{width} \times \text{height})\}] \times Z \text{ value}$$

$$\text{Strength 4} = [100 \times \{(m1 \times m3)/(\text{width} \times \text{height})\}] \times Z \text{ value} \qquad (2)$$

As expressed in Equation (2) above, the vibration strength level of each vibrator increases as the touch duration increases.

Referring back to FIG. 2, in step 211, the portable terminal allows the respective vibrators to vibrate according to the re-determined vibration strength level. In step 213, the portable terminal detects whether the user continues to touch the screen. If the user input is not maintained, the portable terminal terminates an algorithm.

On the contrary, if the user input is maintained, the portable terminal detects, in step 215, whether the user's input position is changed. That is, the portable terminal detects whether the user's touch position is shifted to another position. If it is determined that the user's input position is changed, the procedure returns to step 203 and the portable terminal determines a coordinate corresponding to the changed input position and re-performs subsequent steps. If the user's input position is not changed, the procedure returns to step 205 and the portable terminal counts a duration of input time and re-performs subsequent steps. Here, the portable terminal may count the input time by adding 1 to the previously counted the duration of input.

Alternatively, while the vibration strength level of each vibrator is determined based on the touch position and duration during operation, the vibration strength level of each vibrator may be determined based on only one of the touch position or the touch duration.

Moreover, even when an object or position selected by an input unit of a character, number or direction, for example, a keyboard and a keypad, is shifted, the vibration strength level of each vibrator may be determined according to the shift action of the selected object or position. That is, it may be possible to determine and generate different vibration strength level of each vibrator according to the position of the user's input received via a keypad of the portable terminal, where the area of key pad serves as a touch screen for the purpose of recognizing the touch position and duration.

Hereinafter, various examples to which the present invention is applicable in the operation of touch screen according to the teachings of the present invention will be described with reference to FIGS. 4 to 10. FIGS. 4 to 10 are schematic diagrams illustrating examples of generating a haptic effect in a portable terminal including four vibrators according to embodiments of the present invention.

Figure 4:
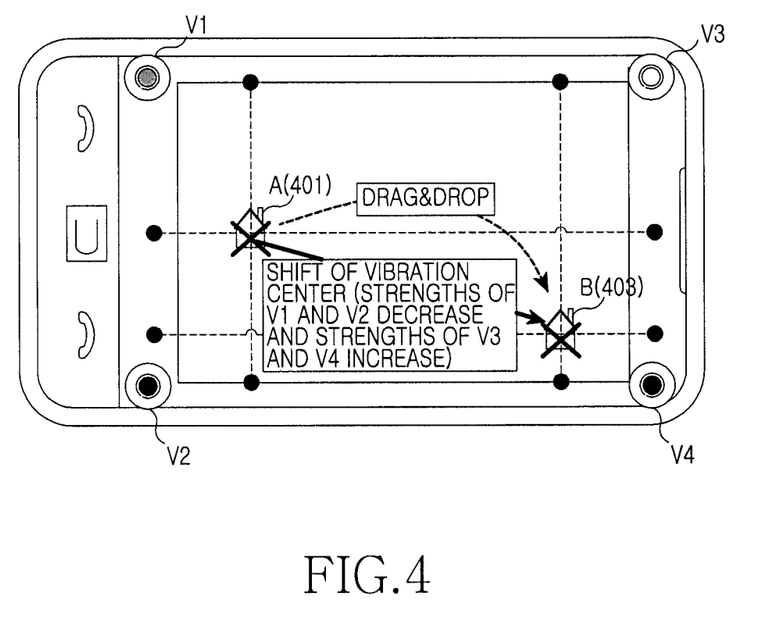

Referring to FIG. 4, an icon located at an A position 401 is shifted to a B position 403 through the drag-and-drop operation of a user in the portable terminal. Here, the user continues to touch the screen while shifting the icon from the A position 401 to the B position 403. Accordingly, the vibrators V1 and V2 generate vibrations of which strengths are higher than those of vibrations generated by the vibrators V3 and V4 at the beginning when the user touches the A position 401. However, as the touch position is shifted, the vibration strengths of the vibrators V1 and V2 gradually decrease but the vibration strengths of the vibrators V3 and V4 gradually increase. Finally, after the touch position is shifted to the B position 403, the vibrators V3 and V4 generate vibrations of which strengths are higher than those of vibrations generated by the vibrators V1 and V2.

Figure 5:
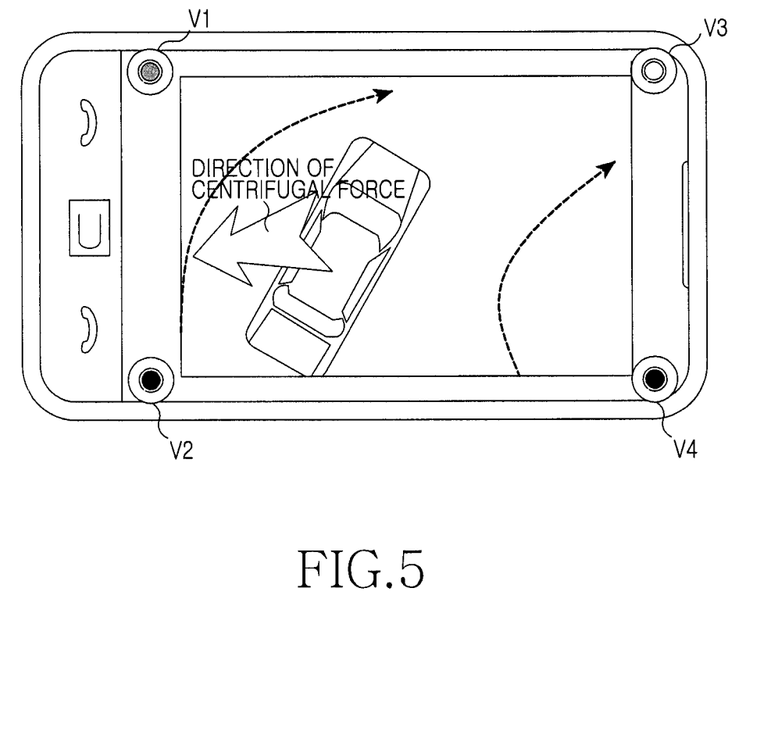

FIG. 5 illustrates that a vehicle is cornering to the right on a vehicle driving game in the portable terminal. In this case, the vibration strengths of the vibrators V1 and V2 are increased higher than those of the vibrators V3 and V4 at the time of corning. As a result, a user may feel that the center of gravity shifts to the left while the vehicle is cornering to the right in the display. To simulate the centrifugal force acting on the vehicle becomes greater as it corners, the strengths of the vibrators V1 and V2 may be set even higher. Similarly, when the vehicle corners to the left, the vibration strength of each vibrator may be controlled such that the vibration strengths of the vibrators V3 and V4 are higher than those of the vibrators V1 and V2.

Figure 6A:
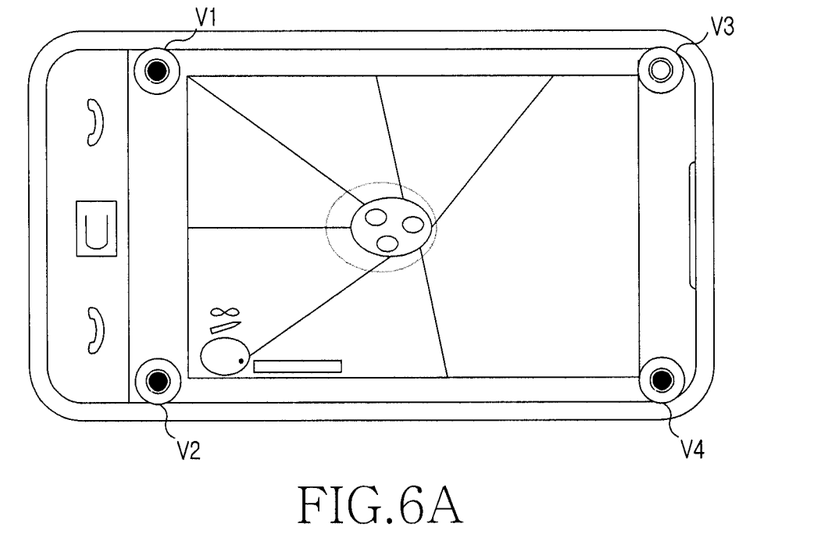
Figure 6B:
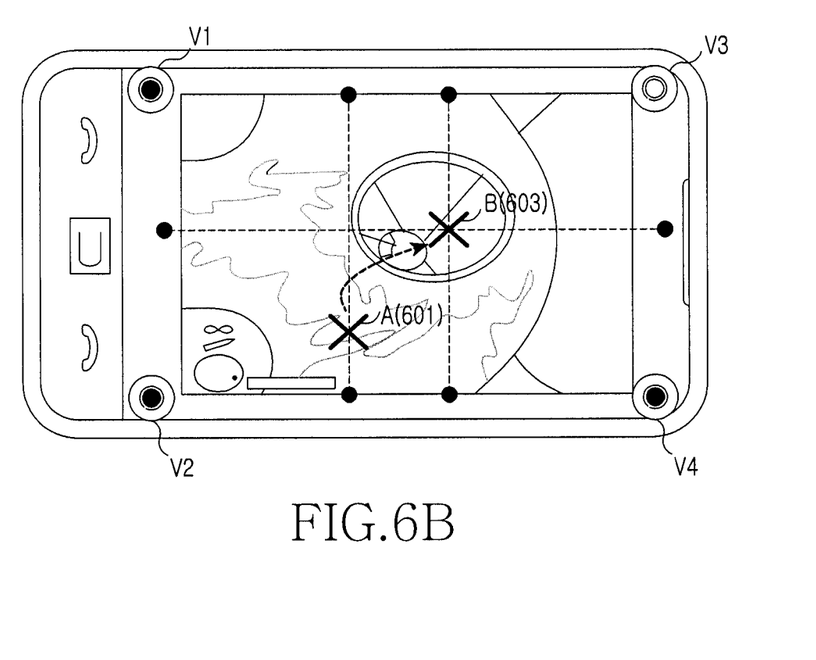

FIGS. 6A and 6B illustrate an obstacle avoiding game of getting through continuously-changing obstacles by a user's touch in the portable terminal. Here, the user moves the touch position from an A position 601 to a B position 603 so as to get through an obstacle. The portable terminal determines the vibration strength of each vibrator at the touch position A 601 and B 603, and generates two different set of vibrations with the determined vibration strength at two different positions, thus allowing the user to feel the change in the movement.

Figure 7:
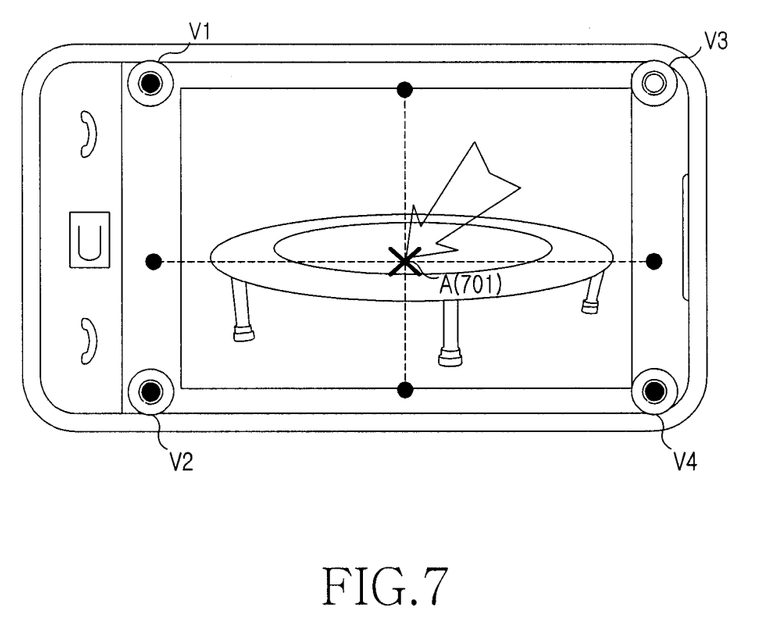

FIG. 7 illustrates a game of bouncing an object according to a touch or user's input in the portable terminal. Since a bounce height of the object changes depending on the touch or user's input duration in this game, the portable terminal allows the user to feel how strongly he/she has bounced an object by changing the vibration strength of each vibrator according to the touch or user's input duration. The longer duration would yield a stronger bouncing action by increasing the vibration strength of each vibrator.

Figure 8:
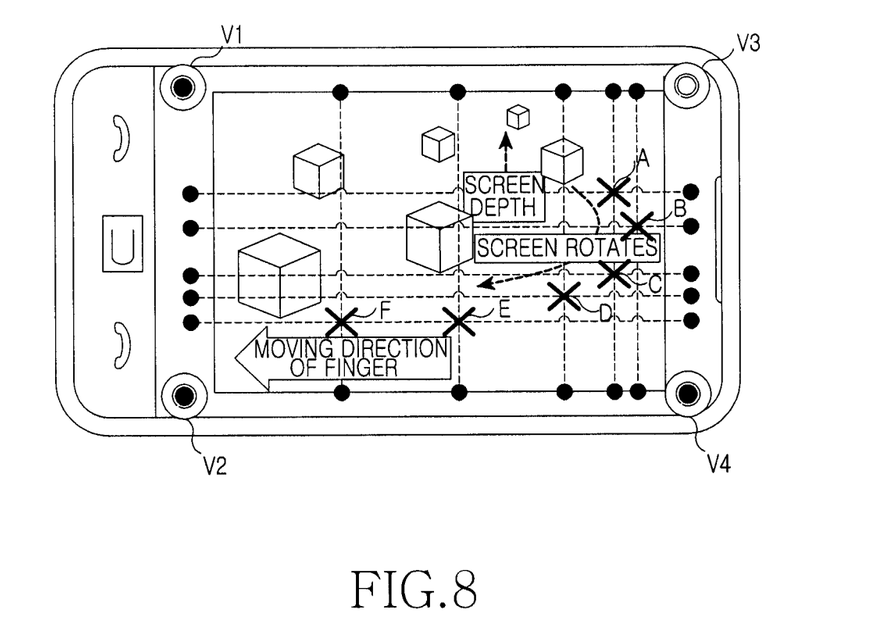

FIG. 8 illustrates a screen configuration controlling a 3-dimensionally rotating user interface (UI) in the portable terminal. When a user touches the screen from an A position to an F position for rotating the screen, the portable terminal may calculate vibration strengths of vibrators V1 to V4 and generate vibration with the determined vibration strength as described with reference to FIG. 2 to simulate the rotation. Intervals of the x-axis between respective positions indicate time intervals taken for next vibration to be generated. Thus, the vibration is rapidly generated when the user touches the screen from the A position to the D position, whereas the vibration is slowly generated when the user touches the screen from the E position to the F position due to a bigger gap between touches.

Figure 9A:
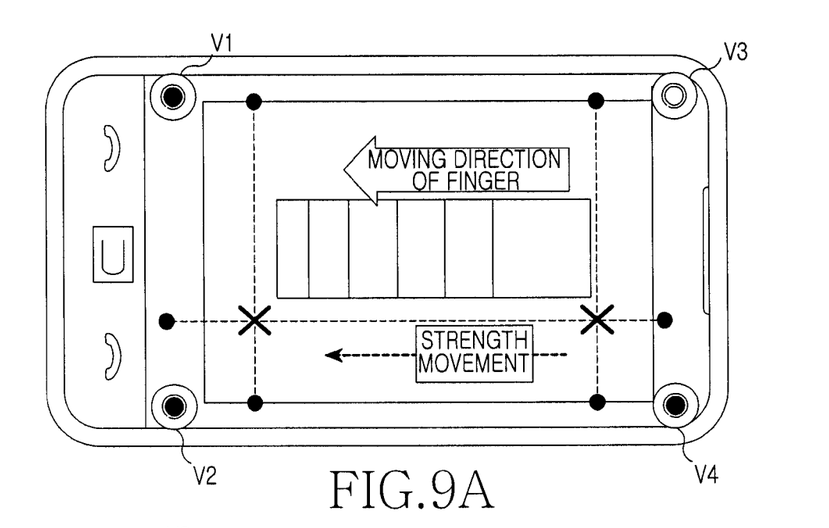
Figure 9B:
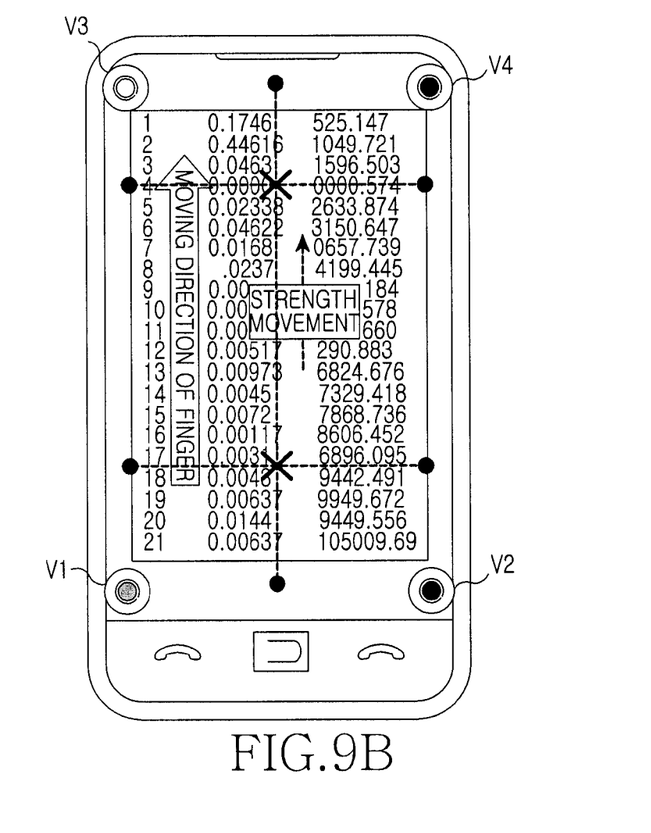

FIGS. 9A and 9B illustrate the case where a screen is flipped or scrolled in the portable terminal. As illustrated in FIGS. 9A and 9B, in the case of UI flipping or scrolling pages, vibration may be generated by changing the vibration strength depending on the flipping or scrolling, or by changing the vibration strength depending on a flipping or scrolling direction. For example, when the screen is flipped or scrolled from the right to the left as illustrated in FIG. 9A, it is possible to provide the effect that the vibration seems to be shifted from the right to the left by changing the vibration strengths of the vibrators V3 and V4 to be increased and then decreased gradually while changing the vibration strengths of the vibrators V1 and V2 to be decreased and then increased progressively. Likewise, when the screen is flipped or scrolled from the bottom to the top as illustrated in FIG. 9B, it is possible to provide the effect that the vibration seems to be shifted from the bottom to the top by changing the vibration strengths of the vibrators V1 and V2 to be increased and then decreased gradually while changing the vibration strengths of the vibrators V3 and V4 to be decreased and then increased progressively.

Figure 10:
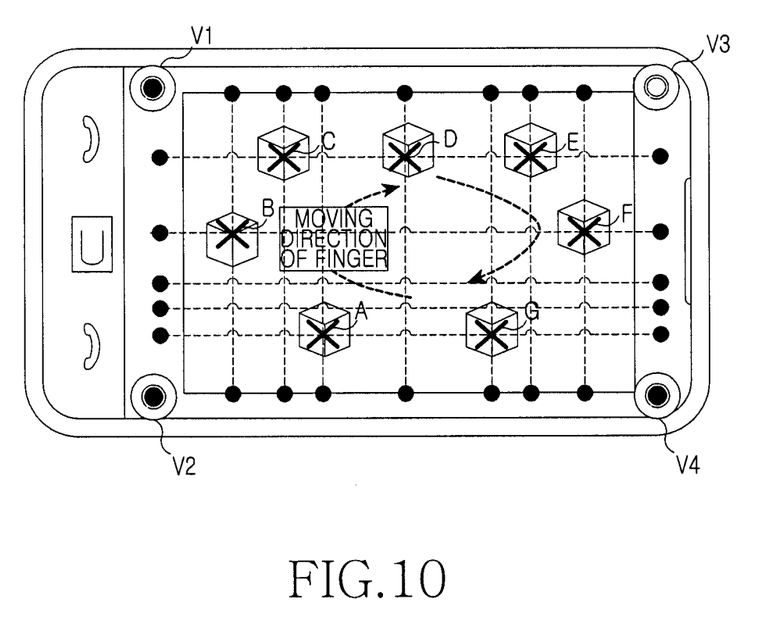

FIG. 10 illustrates the case of touching specific shapes on the screen in the portable terminal. When a user circularly touches the screen as illustrated in FIG. 10, vibration may be generated as if the vibration strengths of the respective vibrators are shifted from V2 to V1, V3 and V4. That is, only the vibrator V2 vibrates strongly first. However, as the user's touch position is changed in a circular motion, the vibrator V2 weakly vibrates gradually and the vibrator V1 starts weakly vibrating and then strongly vibrates progressively. By controlling the vibration strength of each vibrator in this manner for the remaining touches, the portable terminal allows a user to feel the circular touch.

According to the present invention, the portable terminal includes a plurality of vibrators, and the vibration strength of each of the plurality of vibrators is controlled according to a user's touch position and duration of the touch. As a result, vibration can be generated according to a user's touch directionality, thereby allowing the user to feel the 3-dimensional haptic effect.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of providing a haptic effect using a plurality of vibrators in a portable terminal, the method comprising:
   detecting whether a user's input information is generated;
   determining a vibration strength level of each of the vibrators using the user's input information, including:
      detecting a duration of the user's input information; and
      determining the vibration strength level of each of the vibrators to increase proportionally to at least the detected duration; and
   generating vibration according to the determined vibration strength via each of the vibrators,
   wherein the user's input information comprises information for user's input position and distance information between the user's input position and each of the vibrators.

2. The method of claim 1, wherein the user's input position is a position of a screen touched by the user or a position of a keypad activated by the user.

3. The method of claim 1, wherein vibration strength level of the respective vibrators are determined depending on the relative distance between the user's input position and the respective vibrators.

4. The method of claim 1, wherein determining the vibration strength level of each of the vibrators according to at least the duration comprises:
   determining the vibration strength level according to relative distance information and the duration of the user's input information.

5. The method of claim 1, further comprising detecting a shifted input position whenever the user input is shifted.

6. The method of claim 1, wherein determining the vibration strength level of each of the vibrators using the user's input information comprises:
   detecting a change in the center of gravity or a magnitude of centrifugal force exerted on an object according to a cornering direction of the object; and
   changing vibration strength level of the respective vibrators to simulate the change in the center of gravity or the magnitude of centrifugal force.

7. The method of claim 1, wherein determining the vibration strength level of each of the vibrators using the user's input information comprises changing vibration strength level of the respective vibrators in sequence according to a first position and a second position of a user's input to simulate avoiding an obstacle.

8. The method of claim 1, wherein determining the vibration strength level of each of the vibrators using the user's input information comprises:
   generating a stronger vibration for each of the vibrators as the duration is longer.

9. The method of claim 1, wherein determining the vibration strength level of each of the vibrators using the user's input information comprises:
   detecting a plurality of user's touches in a rotation manner; and
   generating a rapid vibration on each of the vibrators when a gap between the plurality of user's touches is smaller and generating a slower vibration on each of the vibrators when a gap between the plurality of user's touches is larger.

10. An apparatus of providing a haptic effect using a plurality of vibrators in a portable terminal, the apparatus comprising:
    a user input unit in which a user's input information is generated;
    a vibration strength determination unit detecting a duration of the user's input information, and determining a vibration strength level of each of the vibrators to increase proportionally to at least the detected duration of the user's input information; and
    a control unit generating vibration according to the determined vibration strength via each of the vibrators,
    wherein the input information of the user input unit comprises information for user's input position and distance information between the user's input position and each of the vibrators.

11. The apparatus of claim 10, wherein the user input unit detects a position of a screen touched by the user or a position of a keypad activated by the user.

12. The apparatus of claim 10, wherein the vibration strength determination unit determines vibration strength level of the respective vibrators are determined depending on the relative distance between the user's input position and the respective vibrators.

13. The apparatus of claim 10, wherein the vibration strength determination unit determines the vibration strength level of each of the vibrators according to relative distance information and the duration of the user's input information.

14. The apparatus of claim 10, wherein the user input unit detects a shifted input position whenever the user input is shifted and provides the shifted input position to the vibration strength determination unit.

15. The apparatus of claim 10, wherein, in a vehicle driving game, the vibration strength determination unit changes vibration strengths of the respective vibrators according to a change in the center of gravity or a magnitude of centrifugal force exerted on an object according to a cornering direction of the object.

16. The apparatus of claim 10, wherein, in an obstacle avoiding game, the vibration strength determination unit changes vibration strength level of the respective vibrators in sequence according to a first position and a second position of a user's input to simulate avoiding an obstacle.

17. The apparatus of claim 10, wherein the vibration strength determination unit generates a stronger vibration for each of the vibrators as the duration is longer.

18. The apparatus of claim 10, wherein the vibration strength determination unit detects a plurality of user's touches in a rotation manner; and generates a rapid vibration on each of the vibrators when a gap between the plurality of user's touches is smaller and generating a slower vibration on each of the vibrators when a gap between the plurality of user's touches is larger.

* * * * *